(12) United States Patent
Li et al.

(10) Patent No.: US 9,122,982 B2
(45) Date of Patent: Sep. 1, 2015

(54) DEVICE AND METHOD FOR DESTINATION PREDICTION

(71) Applicant: NEC (China) Co., Ltd., Beijing (CN)

(72) Inventors: Man Li, Beijing (CN); Weisong Hu, Beijing (CN); Xiaowei Liu, Beijing (CN)

(73) Assignee: NEC (CHINA) CO., LTD., Beijing (CN)

( * ) Notice: Subject to any disclaimer, the term of this patent is extended or adjusted under 35 U.S.C. 154(b) by 231 days.

(21) Appl. No.: 13/938,630

(22) Filed: Jul. 10, 2013

(65) Prior Publication Data

US 2014/0207725 A1    Jul. 24, 2014

(30) Foreign Application Priority Data

Jan. 22, 2013   (CN) .......................... 2013 1 0025384

(51) Int. Cl.
*G06F 9/44* (2006.01)
*G06N 7/02* (2006.01)
*G06N 7/06* (2006.01)
*G06N 7/00* (2006.01)

(52) U.S. Cl.
CPC ....................................... *G06N 7/005* (2013.01)

(58) Field of Classification Search
USPC .......................................................... 706/52
See application file for complete search history.

(56) References Cited

U.S. PATENT DOCUMENTS

| 7,908,075 | B2* | 3/2011 | Qi et al. ...................... 701/117 |
| 7,924,162 | B2* | 4/2011 | Song et al. ................. 340/572.7 |
| 7,937,402 | B2* | 5/2011 | Feng et al. .................... 707/759 |
| 8,117,178 | B2* | 2/2012 | Qi et al. ........................ 707/706 |
| 8,606,727 | B2* | 12/2013 | Wu et al. .......................... 706/12 |
| 8,700,295 | B2* | 4/2014 | Wu et al. ....................... 701/117 |
| 8,958,826 | B2* | 2/2015 | Li et al. ...................... 455/456.3 |

OTHER PUBLICATIONS

Hierarchical destination prediction based on GPS history Wenhao Huang ; Man Li ; Weisong Hu ; Guojie Song ; Kunqing Xie Fuzzy Systems and Knowledge Discovery (FSKD), 2013 10th International Conference on DOI: 10.1109/FSKD.2013.6816336 Publication Year: 2013 , pp. 972-977.*

(Continued)

*Primary Examiner* — Michael B Holmes
(74) *Attorney, Agent, or Firm* — Tutunjian & Bitetto, P.C.

(57) ABSTRACT

A device for constructing a hierarchical destination prediction mode includes an extracting unit configured to receive a user's historical location data and extract input data and output data from the user's historical location data. The input data includes a leaving location and associated time for the user and the output data includes an arriving location for the user. A determining unit is configured to determine the user's possible activities of each location and their original probabilities based on the input data and the output data, and to adjust the original activity probabilities based on the user's arriving patterns and leaving patterns. A prediction model obtaining unit is configured to obtain the hierarchical destination prediction model based on the input data and the adjusted probabilities. A high layer of the hierarchical destination prediction model represents activities and their transitions, and a low layer of the model represents locations of the activities.

14 Claims, 6 Drawing Sheets

(56) References Cited

OTHER PUBLICATIONS

Predictive autonomous robot navigation Foka, A.F.; Trahanias, P.E. Intelligent Robots and Systems, 2002. IEEE/RSJ International Conference on vol. 1 DOI: 10.1109/IRDS.2002.1041438 Publication Year: 2002, pp. 490-495 vol. 1.*

Optimal Perimeter Control for Two Urban Regions With Macroscopic Fundamental Diagrams: A Model Predictive Approach Geroliminis, N.; Haddad, J.; Ramezani, M. Intelligent Transportation Systems, IEEE Transactions on vol. 14, Issue: 1 DOI: 10.1109/TITS.2012.2216877 Publication Year: 2013, pp. 348-359.*

Model predictive perimeter control for urban areas with macroscopic fundamental diagrams Haddad, J.; Ramezani, M.; Geroliminis, N. American Control Conference (ACC), 2012 DOI: 10.1109/ACC.2012.6314693 Publication Year: 2012, pp. 5757-5762.*

Optimal dynamic route guidance: A model predictive approach using the macroscopic fundamental diagram Hajiahmadi, M.; Knoop, V.L.; De Schutter, B.; Hellendoorn, H. Intelligent Transportation Systems—(ITSC), 2013 16th International IEEE Conference on DOI: 10.1109/ITSC.2013.6728366 Publication Year: 2013, pp. 1022-1028.*

Bayesian nonparametric modeling of driver behavior Straub, J.; Sue Zheng; Fisher, J.W. Intelligent Vehicles Symposium Proceedings, 2014 IEEE DOI: 10.1109/IVS.2014.6856580 Publication Year: 2014, pp. 932-938.*

Hierarchical Bayesian Nonparametric Approach to Modeling and Learning the Wisdom of Crowds of Urban Traffic Route Planning Agents Jiangbo Yu; Kian Hsiang Low; Oran, A.; Jaillet, P. Web Intelligence and Intelligent Agent Technology (WI-IAT), IEEE/WIC/ACM Intl Conf. on vol. 2 DOI: 10.1109/WI-IAT.2012.216 Pub. Yr. pp. 478-485.*

* cited by examiner

Fig. 1

Table 1 – Historical location data

| Time | Leaving location | Destination (arriving location) |
|---|---|---|
| 11.1 Friday 18:00 | A | B |
| 11.4 Monday 17:50 | B | C |
| 11.11 Monday 18:00 | B | D |
| 11.5 Tuesday 20:00 | D | A |
| 11.6 Wed 17:00 | B | E |
| 11.6 Wed 19:00 | C | A |
| 11.7 Thursday 17:15 | B | E |
| 11.7 Thursday 19:15 | C | A |
| 11.8 Friday 17:20 | B | E |
| 11.8 Friday 19:10 | D | A |
| - - | | |

Table 2 – Original Activity Probabilities of Locations

|   | Staying at home | Working | - - | Dining | Shopping |
|---|---|---|---|---|---|
| A | 1 | 0 |   | 0 | 0 |
| B | 0 | 1 |   | 0 | 0 |
| C | 0 | 0.2 |   | 0.8 | 0 |
| D | 0 | 0 |   | 0.6 | 0.4 |

Table 3 – adjusted activity probabilities of locations
(at 17:00 ~ 24:00 on weekdays)

|   | Staying at home | Working | - - | Dining | Shopping |
|---|---|---|---|---|---|
| A | 1 | 0 |   | 0 | 0 |
| B | 0 | 1 |   | 0 | 0 |
| C | 0 | 0.05 |   | 0.95 | 0 |
| D | 0 | 0 |   | 0.7 | 0.3 |

Fig. 2

Table 1 – Historical location data

| Time | Leaving location | Destination location |
|---|---|---|
| 11.1 Friday 17:00 | B | A |
| 11.4 Monday 17:50 | B | A |
| 11.5 Tuesday 18:00 | B | D |
| 11.6 Wednesday 17:00 | B | A |
| 11.7 Thursday 17:15 | B | C |
| - - | | |

Table 3 – adjusted activity probabilities of locations (at 17:00 ~ 24:00 on weekdays)

| | Staying at home | Working | - - | Dining | Shopping |
|---|---|---|---|---|---|
| A | 1 | 0 | | 0 | 0 |
| B | 0 | 1 | | 0 | 0 |
| C | 0 | 0.05 | | 0.95 | 0 |
| D | 0 | 0 | | 0.7 | 0.3 |

Table 4 – Historical location-activity data

| Time | Leaving location | Leaving activity | Destination location | Destination activity | Destination activity probability |
|---|---|---|---|---|---|
| 11.1 Friday 17:00 | B | working | A | staying at home | 1 |
| 11.4 Monday 17:50 | B | working | A | staying at home | 1 |
| 11.5 Tuesday 18:00 | B | working | D | dining | 0.7 |
| 11.5 Tuesday 18:00 | B | working | D | shopping | 0.3 |
| 11.6 Wednesday 17:00 | B | working | A | staying at home | 1 |
| 11.7 Thursday 17:15 | B | working | C | dining | 0.95 |
| 11.7 Thursday 17:15 | B | working | C | working | 0.05 |
| - - | | | | | |

DEVICE AND METHOD FOR DESTINATION PREDICTION

TECHNICAL FIELD

The present application relates to the technical field of data analysis, and more particularly, to a device and a method for destination prediction.

BACKGROUND

Location based services provide services or information recommendations based on a user's location information. The qualities of the location based services are dependent on techniques for destination prediction. If the user's destination location can be predicted accurately, it is then possible to provide the user with personalized location based services and associated information recommendations in accordance with the place to which the user is destined in the future. For example, information on parking lots, traffic conditions and shop discounts near the user's destination can be automatically provided to the user.

Traditional destination prediction techniques rely on a transition pattern between locations to predict a possible destination location in the future. However, in most cases, the characteristics of the transition between locations might not be sufficiently significant. For example, a certain user usually goes to parks on weekends, but may go to different parks each time. In this case, it is impossible to find out the location transmission pattern of the user and thus impossible to accurately predict the user's destination location.

Thus, there is a need for a solution capable of accurately predicting a user's destination location.

SUMMARY

According to the present application, a hierarchical predication model is used for predicting a user's destination location and activities based on a transition pattern for activities instead of locations, since transition of activities is more regular and thus more predictable than transition of locations.

According to a first aspect of the present invention, a device for constructing a hierarchical destination prediction model is provided. The device includes: an extracting unit configured to receive a user's historical location data and extract input data and output data from the user's historical location data, the input data including a leaving location and associated time for the user, the output data including an arriving location for the user; a determining unit configured to determine the user's possible activities of each location and their original probabilities based on the input data and the output data, and to adjust the original activity probabilities based on the user's arriving patterns and leaving patterns; and a prediction model obtaining unit configured to obtain the hierarchical destination prediction model based on the input data and the adjusted probabilities. A high layer of the hierarchical destination prediction model represents activities and their transitions and a low layer of the hierarchical destination prediction model represents locations of the activities.

Preferably, the determining unit is configured to obtain the user's possible activities of each location and their original probabilities by using manual annotation or map data calculation.

Preferably, the determining unit is configured to judge whether the user's arriving patterns and leaving patterns for two locations are similar, and if they are similar, increase probabilities of the same activity of the two locations and decrease probabilities of other activities of the two locations.

Preferably, the prediction model obtaining unit is configured to obtain the hierarchical destination prediction model based on the input data and the adjusted probabilities by using any of a Markov model, a Neural Network model, or a Frequent Pattern model.

Preferably, the determining unit is configured to judge arriving patterns and leaving patterns for two locations that are similar if a previous location and a next location for one of the two locations are the same as those for the other of the two locations, respectively, and arriving times and leaving times for the two locations are within same time periods, respectively.

Preferably, the determining unit is configured to judge arriving patterns and leaving patterns for two locations that are similar if a previous location and a next location for one of the two locations are close to those for the other of the two locations, respectively, and arriving times and leaving times for the two locations are within same time periods, respectively.

According to a second aspect of the present invention, a destination prediction device is provided. The device includes: a receiving unit configured to receive a user's leaving location and associated time; a predicting unit configured to apply a hierarchical destination prediction model to predict the user's destination and activity, based on the received user's leaving location and associated time. A high layer of the hierarchical destination prediction model represents activities and their transitions, and a low layer of the hierarchical destination prediction model represents locations of the activities.

Preferably, the destination prediction device further includes a storing unit configured to store a user's real location data, the user's real location data being used to update the user's historical location data.

According to a third aspect of the present invention, a method for constructing a hierarchical destination prediction model is provided. The method includes: receiving a user's historical location data and extracting input data and output data from the user's historical location data, the input data including a leaving location and associated time for the user, the output data including an arriving location for the user; determining the user's possible activities of each location and their original probabilities based on the input data and the output data, and adjusting the original activity probabilities based on the user's arriving patterns and leaving patterns; and obtaining the hierarchical destination prediction model based on the input data and the adjusted probabilities, wherein a high layer of the hierarchical destination prediction model representing activities and their transitions and a low layer of the hierarchical destination prediction model representing locations of the activities.

Preferably, the user's possible activities of each location and their original probabilities are obtained by using manual annotation or map data calculation.

Preferably, the step of adjusting comprises judging whether the user's arriving patterns and leaving patterns for two locations are similar, and if they are similar, increasing probabilities of the same activity of the two locations and decreasing probabilities of other activities of the two locations.

Preferably, the step of obtaining comprises obtaining the hierarchical destination prediction model based on the input data and the adjusted probabilities by using any of a Markov model, a Neural Network model, or a Frequent Pattern model.

Preferably, arriving patterns and leaving patterns for two locations are judged to be similar if a previous location and a next location for one of the two locations are the same as those for the other of the two locations respectively and arriving times and leaving times for the two locations are within same time periods respectively.

Preferably, arriving patterns and leaving patterns for two locations are judged to be similar if a previous location and a next location for one of the two locations are close to those for the other of the two locations, respectively, and arriving times and leaving times for the two locations are within same time periods, respectively.

According to a fourth aspect of the present invention, a destination prediction method is provided. The method includes: receiving a user's leaving location and associated time; applying a hierarchical destination prediction model to predict the user's destination and activity, based on the received user's leaving location and associated time. A high layer of the hierarchical destination prediction model represents activities and their transitions, and a low layer of the hierarchical destination prediction model represents locations of the activities.

Preferably, the destination prediction method further includes storing a user's real location data, the user's real location data being used to update the user's historical location data.

With the embodiments of the present application, the user's future destination location and destination activities can be accurately predicted, even in the case where the user's location transition is not regular.

BRIEF DESCRIPTION OF THE DRAWINGS

The above and other objects, features and advantages will be more apparent from the following description of embodiments with reference to the figures, in which.

DETAILED DESCRIPTION

The embodiments of the present invention will be detailed below with reference to the drawings. It should be noted that the present invention is not limited to the following embodiments. In the following description, details of well known techniques irrelevant to the present invention will be omitted so as not to obscure the concept of the invention.

Figure 1:
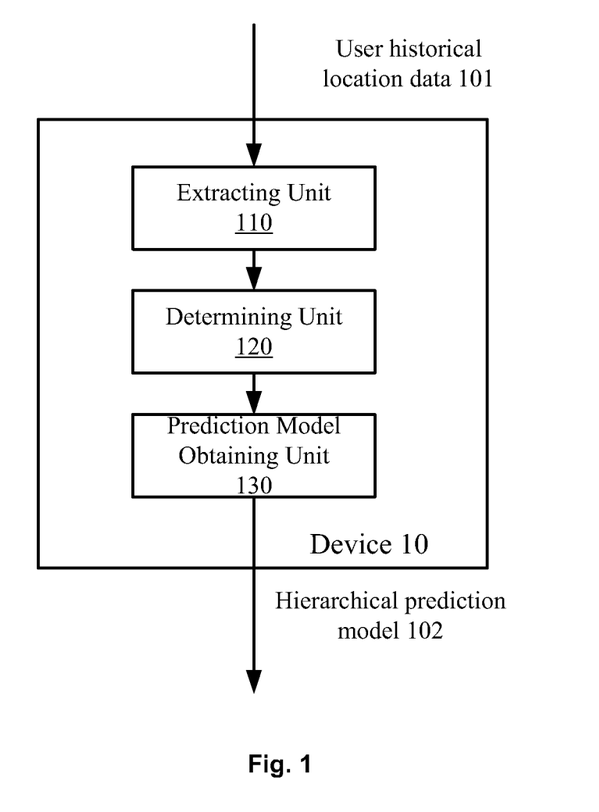
FIG. 1 is a block diagram of a device for constructing a hierarchical destination prediction model according to an embodiment of the present invention.

FIG. 1 is a block diagram of a device 10 for constructing a hierarchical destination prediction model according to an embodiment of the present invention. As shown in FIG. 1, the device 10 includes an extracting unit 110, a determining unit 120 and a prediction model obtaining unit 130. In the following, the operations of the extracting unit 110, the determining unit 120 and the prediction model obtaining unit 130 will be detailed with reference to FIGS. 2 and 3.

Figure 2:
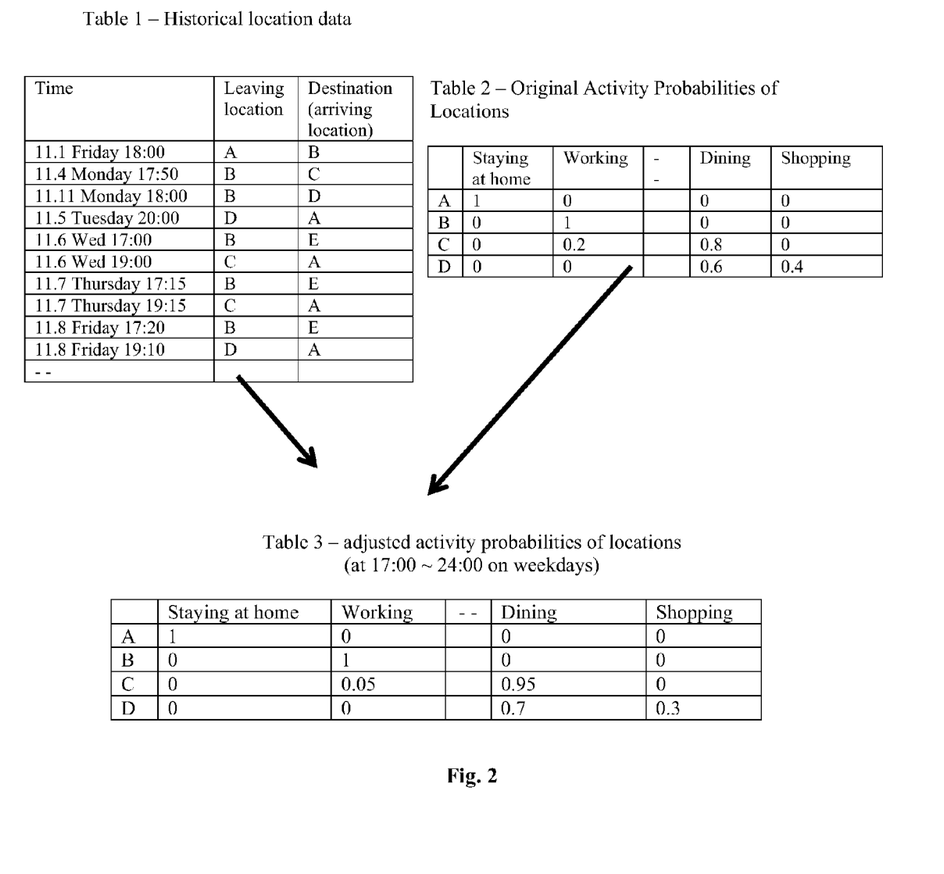
FIG. 2 is a schematic diagram showing a data table used by a device for constructing a hierarchical destination prediction model according to an embodiment of the present invention.

The extracting unit 110 is configured to extract input data and output data from the user's historical location data. Herein, the input data includes a leaving location and associated time for the user and the output data includes a destination location for the user. Referring to FIG. 2, Table 1 shows a user's location data (leaving location and arriving location for each travel) in a past time period. In Table 1, the first column and the second column show the user's associated time and leaving locations, respectively, and the third column shows the user's destination locations (arriving locations). The entries A, B, C . . . can include specific longitude and latitude data such as 116.12504, 40.2876. However, the form of the location data entries A, B, C . . . is not limited to this.

The determining unit 120 is configured to determine the user's possible activities of each location and their original probabilities based on the input data and the output data, and to adjust the original activity probabilities based on the user's arriving patterns and leaving patterns, so as to obtain the user's activities at each location and their probabilities during a particular time period.

In particular, the determining unit 120 can obtain the user's possible activities of each location and their original probabilities by using manual annotation or map data calculation. For example, the determining unit 120 can obtain a semantic item for each location based on the map data (e.g., whether a location is a restaurant or a shopping mall). Then, the determining unit 120 can obtain one or more activities at the location based on a mapping relationship between the semantic items and the activities. For example, a restaurant corresponds to an activity of dining. If the location is a shopping mall which may include a number of shops and restaurants, it corresponds to two semantic items which are mapped to two activities, shopping and dining, respectively. The determining unit 120 can obtain the respective original probabilities for the two activities (i.e., shopping and dining) at the shopping mall based on the scales and numbers of the shops and restaurants in the shopping mall. The activities corresponding to a particular location and their original probabilities are the same to all users.

Referring to FIG. 2, Table 2 shows the possible activities for each location and their original probabilities as obtained by the determining unit 120. For example, the possible activities for Location C are "working" and "dining" which have probabilities of 0.2 and 0.8, respectively. The possible activities for Location D are "dining" and "shopping" which have probabilities of 0.6 and 0.4, respectively.

Further, the determining unit 120 adjusts the original activity probabilities based on the user's arriving patterns and leaving patterns to make them closer to the characteristics of the user's activities. The primary principle of the adjustment is that, if the user's arriving patterns and leaving patterns for two locations are similar, the user's activities at these two locations will also be similar.

The term "arriving pattern" as used herein refers to all location transitions destined to a stop L, i.e., from its previous stop to the stop L as the destination location, during a particular time period. The term "leaving pattern" as used herein refers to all location transitions leaving from a stop L, i.e., from the stop L as the leaving location to its next stop, during a particular time period. Here, a stop refers to a geographical location where the user stays for a time length longer than a threshold that can be determined depending on actual situation (e.g., determined as 30 minutes). An operation example will be given for describing how the determining unit 120 adjusts the original probabilities, with reference to FIG. 2.

The arriving pattern for Location C (i.e., Location C is the arriving location) is:

B→C at 17:50, Monday.

The leaving pattern for Location C (i.e., Location C is the leaving location) is:

C→A at 19:00, Wednesday; C→A at 19:15, Thursday.

The arriving pattern for Location D (i.e., Location D is the arriving location) is:

B→D at 18:00, Monday.

The leaving pattern for Location D (i.e., Location D is the leaving location) is:

D→A at 20:00, Tuesday; D→A at 19:10, Friday.

It can be seen that the arriving patterns for Locations C and D are very similar in that the user left Location B for Location C or D during 17:50-18:00 on Monday. The leaving patterns for Locations C and D are also very similar in that the user left Location C or D for Location A at 19:00-20:00 on weekdays. Thus, the determining unit 120 determines that the activities at Locations C and D may be similar and then increases the probabilities of the activities (dining) common to the two locations and decreases the probabilities of other activities. The determining unit 120 can increase the probabilities by an increment or a factor. For example, as shown in Table 3 in FIG. 2, the determining unit 120 increases the probability at which the user dines at Location C to 0.95 and decreases the probability of "working" at Location C to 0.05. Accordingly, the determining unit 120 increases the probability at which the user dines at Location D to 0.7 and decreases the probability of "shopping" at Location D to 0.3.

It is to be noted here that the condition for the determining unit 120 to determine the arriving patterns and the leaving patterns of two locations to be similar is not limited to the above one. For example, if the user went to two locations from the same location but left the two locations for two different destinations, the determining unit 120 can determine the arriving patterns and the leaving patterns of the two locations to be similar as long as the distance between the two destinations is short enough (e.g., shorter than a defined threshold) and the user arrived at the two locations during the same time period and left the two locations during the same time period. Other determination conditions can be contemplated depending on actual situations.

Referring back to FIG. 1, the prediction model obtaining unit 130 is configured to obtain a hierarchical destination prediction model 102 based on the input data (the user's leaving location and the associated time) and the adjusted probabilities. It is a conditional activity transition prediction. That is, the activity transition is predicted dependent on a particular leaving location and leaving time. There is a mapping relationship between arriving activities and particular locations. The prediction can be implemented using a Markov model, a Neural Network model, a Frequent Pattern model or other techniques. The obtained hierarchical prediction model 102 includes two layers: a high layer representing activities and their transitions, and a low layer representing locations of the activities. In the following, an operation example of the prediction model obtaining unit 130 will be described with reference to FIG. 3.

Figure 3:
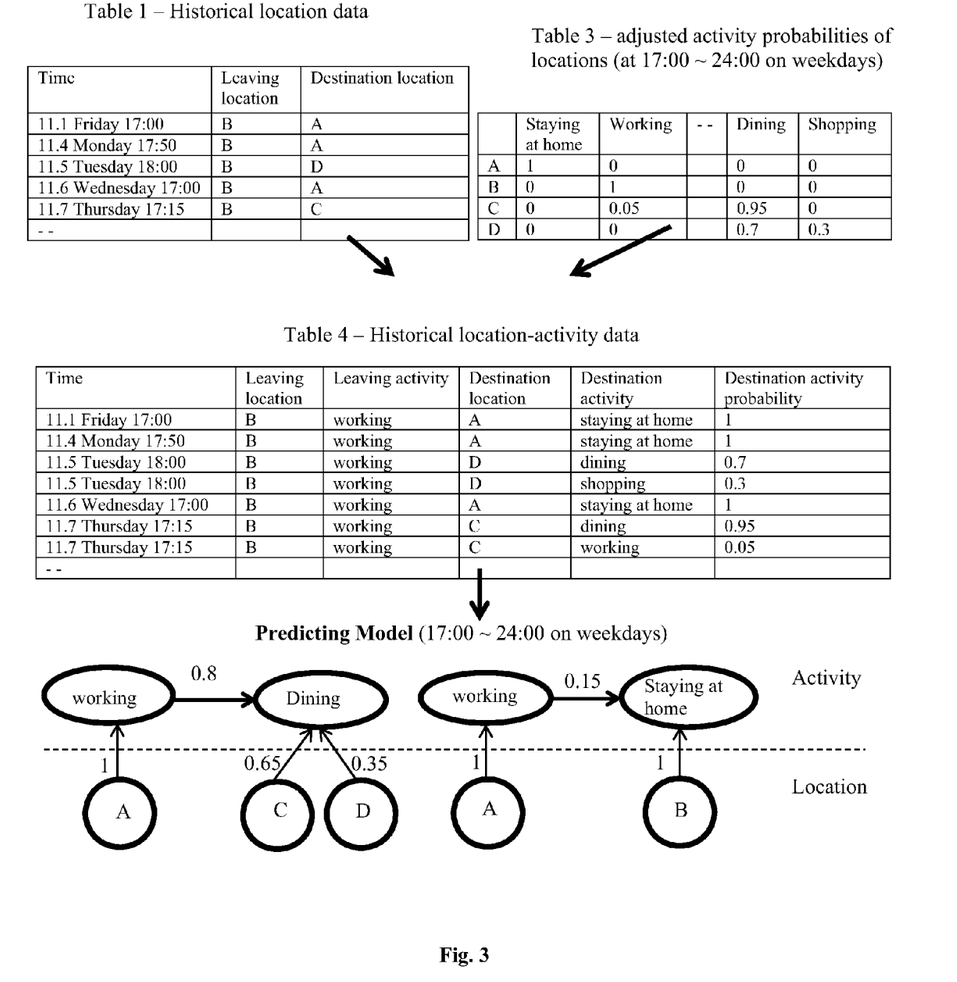
FIG. 3 is a schematic diagram of a hierarchical prediction model constructed by a device for constructing a hierarchical destination prediction model according to an embodiment of the present invention.

The prediction model obtaining unit 130 can obtain the user's historical position-activity data (Table 4), i.e., the user's activities at each location and their probabilities, based on the historical location data (Table 1) and the user's adjusted activity probabilities (Table 3) shown in FIG. 3. Then, the hierarchical prediction model 102 can be obtained by training the data in Table 4. As shown in the lower part of FIG. 3, the hierarchical prediction model 102 includes two layers: a high layer representing activities and their transitions, and a low layer representing locations. These two layers are associated with each other by the mapping relationship between activities and locations and the probabilities. For example, the hierarchical prediction model 102 in FIG. 3 shows that the user has two types of activity transitions at 17:00-24:00 on weekdays. In the first type of activity transition, the user dines after working (at a probability of 0.8) and the working location is A, the dining location may be C (at a probability of 0.65) or D (at a probability of 0.35). In the second type of activity transition, the user goes home after working (at a probability of 0.15) and the working location is A, the home location is B.

With the device 10 for constructing hierarchical destination prediction model according to this embodiment, a hierarchical prediction model capable of accurately predicting a user's destination locations and activities can be generated.

Figure 4:
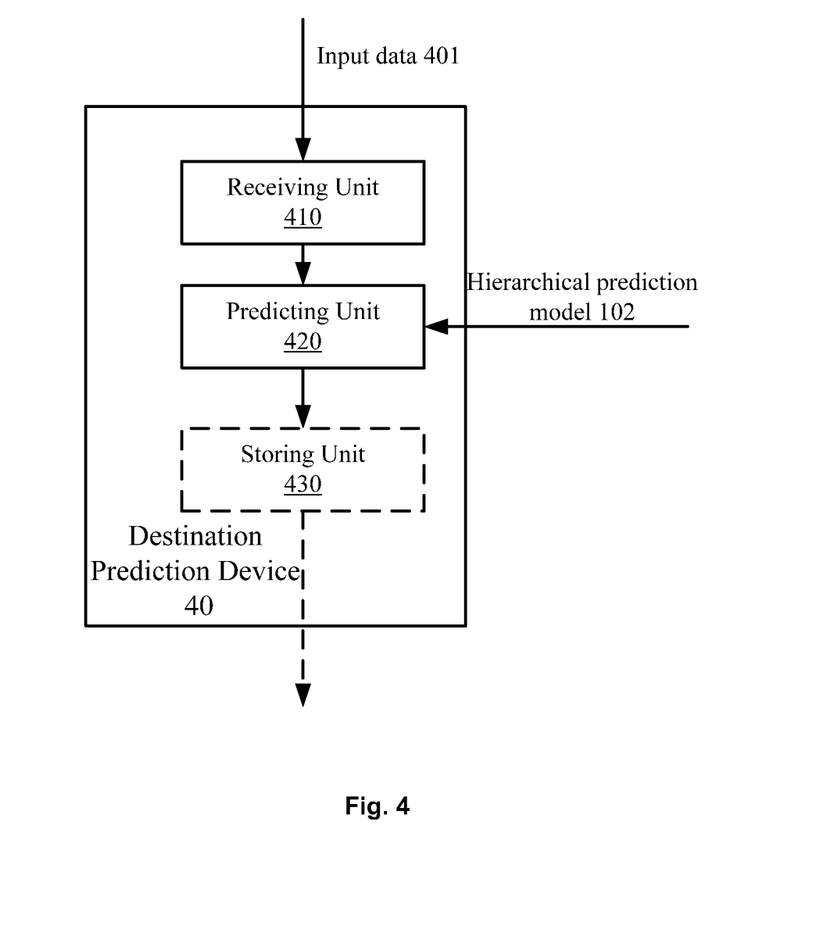
FIG. 4 is a block diagram of a destination prediction device according to an embodiment of the present invention.

FIG. 4 is a block diagram of a destination prediction device 40 according to an embodiment of the present invention. As shown in FIG. 4, the destination prediction device 40 includes a receiving unit 410 and a prediction unit 420. Alternatively, the destination prediction device 40 can further include a storing unit 430 (as shown in dashed block).

The receiving unit 410 is configured to receive input data 401 (i.e., a user's leaving location and associated time). The predicting unit 420 is configured to apply a hierarchical destination prediction model 102 to predict the user's destination and activity, based on the received input data 401. Here the hierarchical destination prediction model 102 can be the hierarchical destination prediction model 102 obtained by the device 10 for constructing a hierarchical destination prediction model as described above (referring to FIG. 3).

As an example, it is assumed that the data received by the receiving unit 410 indicates a leaving location of "B" and a leaving time of "17:00, Thursday, Nov. 15, 2012". The predicting unit 420 can predict, by applying the hierarchical destination prediction model 102, that the user's possible future activities include "dining" and "staying at home". In this case, the probability of "dining" is 0.8 (the probability of dining at Location C is 0.65 and the probability of dining at Location D is 0.35) and the probability of "staying at home" is 0.15 (the probability of being at Location A is 1).

The destination prediction device 40 can further include an optional storing unit 430 configured to store a user's real location data and send the stored real location data regularly to update the user's historical location data (e.g., to update Table 1 shown in FIG. 2). The device 10 for constructing hierarchical destination prediction model can obtain an improved hierarchical destination prediction model 102 based on the user's updated historical location data.

With the destination prediction device 40 according to this embodiment, the user's future destination location and destination activities can be accurately predicted, even in the case where the user's location transition is not regular.

Figure 5:
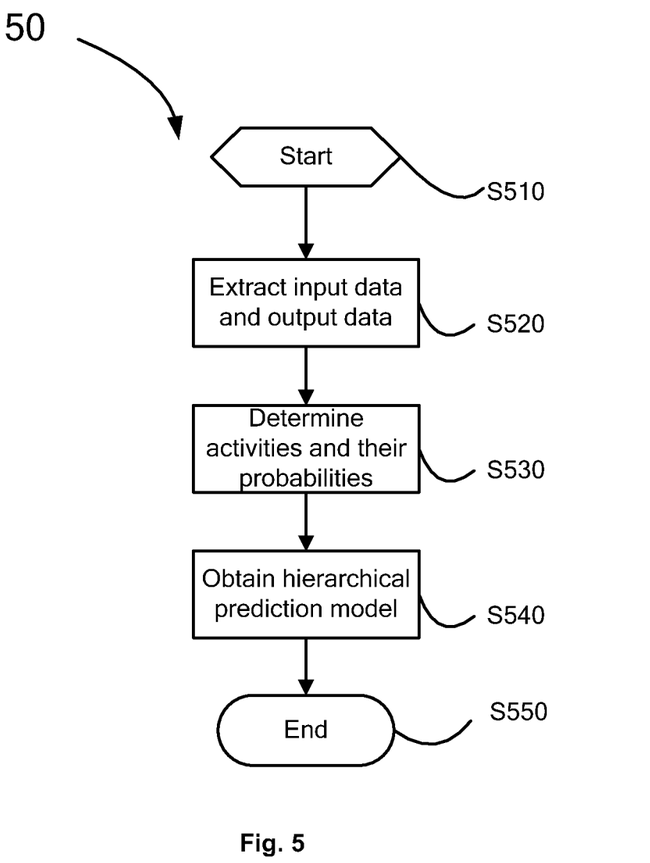
FIG. 5 is a flowchart illustrating a data analysis method according to an embodiment of the present invention.

FIG. 5 is a flowchart illustrating a data analysis method 50 according to an embodiment of the present invention. As shown in FIG. 5, the method 50 starts with step S510.

At step S520, an input data and an output data are extracted from the user's historical location data. As explained above, the input data includes a leaving location and associated time for the user and the output data includes a destination location for the user. Referring to FIG. 2, Table 1 shows a user's location data (leaving location and arriving location for each travel) in a past time period. In Table 1, the first column and the second column show the user's leaving locations and the associated time, respectively, and the third column shows the user's destination locations (arriving locations). The entries A, B, C . . . can include, but are not limited to, specific longitude and latitude data.

At step S530, the user's possible activities of each location and their original probabilities are determined based on the input data and the output data, and the original activity probabilities are adjusted based on the user's arriving patterns and leaving patterns, so as to obtain the user's activities at each location and their probabilities during a particular time period. The user's possible activities of each location and their original probabilities can be obtained by using manual annotation or map data calculation. The activities corresponding to a particular location and their original probabilities are the same to all users. For example, referring to FIG. 2, Table 2 shows the possible activities for each location and their original probabilities as obtained in the step S530. For example, the possible activities for Location C are "working" and "dining" which have probabilities of 0.2 and 0.8, respectively. The possible activities for Location D are "dining" and "shopping" which have probabilities of 0.6 and 0.4, respectively.

Further, the original activity probabilities are adjusted based on the user's arriving patterns and leaving patterns so as to be closer to the characteristics of the user's activities. It is judged whether the user's arriving patterns and leaving patterns for two locations are similar, and if they are similar, the probabilities of the same activity of the two locations can be increased and the probabilities of other activities of the two locations can be decreased. For example, referring to FIG. 2, the arriving patterns for Locations C and D are very similar in that the user left Location B for Location C or D during 17:50-18:00 on Monday and the leaving patterns for Locations C and D are also very similar in that the user left Location C or D for Location A at 19:00-20:00 on weekdays. In this case, the probabilities of the activities (dining) common to the two locations can be increased and the probabilities of other activities can be decreased. The probabilities can be increased by an increment or a factor. For example, as shown in Table 3 in FIG. 2, the probability at which the user dines at Location C can be increased to 0.95 and the probability of "working" at Location C can be decreased to 0.05. Accordingly, the probability at which the user dines at Location D can be increased to 0.7 and the probability of "shopping" at Location D can be decreased to 0.3.

Then, at step S540, a hierarchical destination prediction model is obtained based on the input data and the adjusted probabilities. A high layer of the hierarchical destination prediction model represents activities and their transitions, and a low layer of the hierarchical destination prediction model represents locations of the activities (referring to FIG. 3). The step S540 can be implemented using a Markov model, a Neural Network model, a Frequent Pattern model or other techniques.

Finally, the method 50 ends at step S550.

Figure 6:
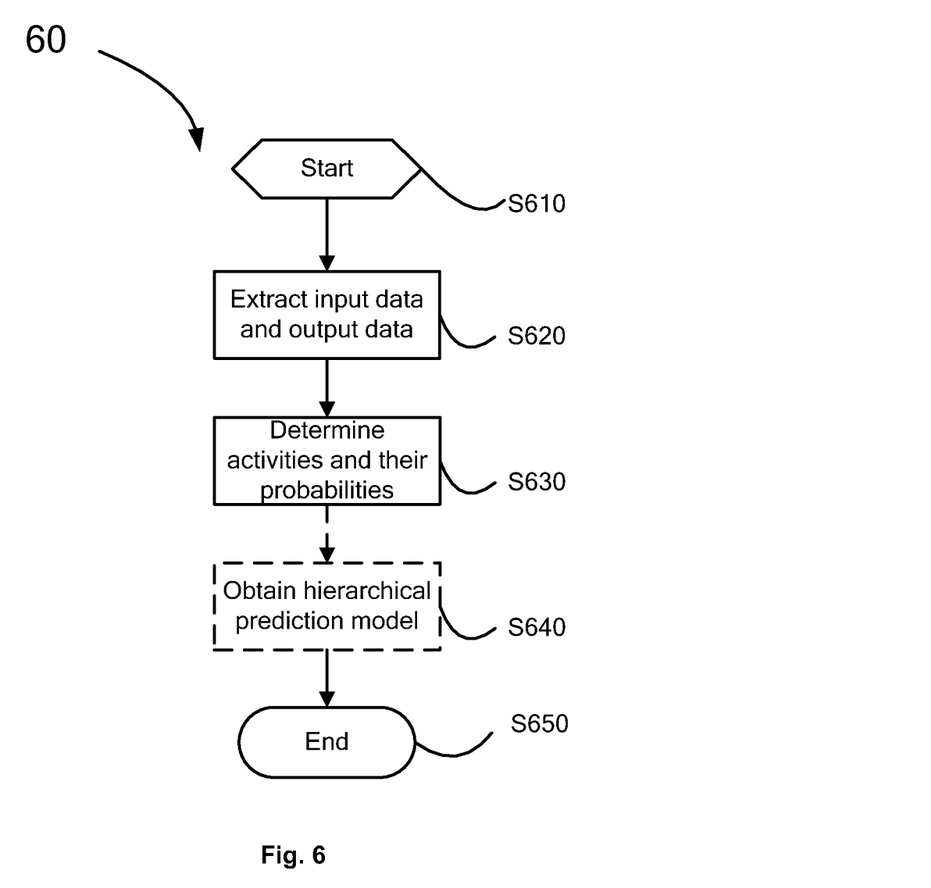
FIG. 6 is a flowchart illustrating a prediction method according to an embodiment of the present invention.

FIG. 6 is a flowchart illustrating a prediction method 60 according to an embodiment of the present invention. As shown in FIG. 6, the method 60 starts with step S610.

At step S620, a user's leaving location and associated time is received. Then, at step S630, a hierarchical destination prediction model is applied to predict the user's destination and activity, based on the received user's leaving location and associated time.

As an example, it is assumed that the data received by the receiving unit 410 indicates a leaving location of "B" and a leaving time of "17:00, Thursday, Nov. 15, 2012". By applying the hierarchical destination prediction model 102, it can be predicted that the user's possible future activities include "dining" and "staying at home". In this case, the probability of "dining" is 0.8 (the probability of dining at Location C is 0.65 and the probability of dining at Location D is 0.35) and the probability of "staying at home" is 0.15 (the probability of being at Location A is 1).

The method 60 can further include an optional step S640 where the user's real location data is stored and sent regularly to update the user's historical location data (e.g., to update Table 1 shown in FIG. 2). An improved hierarchical destination prediction model can be obtained based on the user's updated historical location data.

Finally, the method 60 ends at step S650.

It is to be noted here that the above embodiments of the present invention can be implemented in software, hardware or any combination thereof. For example, various components in the device for constructing a hierarchical destination prediction model and the destination prediction device according to the above embodiments can be implemented using various devices including, but not limited to, analog circuit, digital circuit, general purpose processor, digital signal processing (DSP) circuit, programmable processor, application specific integrated circuit (ASIC), field programmable gate array (FPGA), programmable logical device (CPLD), etc.

In addition, it can be appreciated by those skilled in the art that the user's historical location data or real travel data as described in the above embodiments can be stored in a local database or a distributed database or a remote database.

Further, the embodiments of the present disclosure can be implemented in a computer program product. In particular, the computer program product can be a product having a computer readable medium with computer program logics coded thereon. When executed in a computing device, the computer program logics provide operations for implementing the above solutions of the present invention. When executed in at least one processor of a computing system, the computer program logics cause the processor to perform the operations (methods) described in the embodiments of the present invention. Typically, this arrangement of the present invention is provided as software, codes and/or other data structures set or coded on a computer readable medium such as optical medium (e.g., CD-ROM), floppy disk or hard disk, or firmware or micro-codes on one or more ROM or RAM or PROM chips, or software images or shared database downloadable from one or more modules. The software or firmware or arrangement can be loaded onto a computing device to enable one or more processors in the computing device to implement the solutions described in the embodiments of the present invention.

The present disclosure has been described above with reference to the preferred embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached and the equivalents thereof.

The invention claimed is:

1. A device for constructing a hierarchical destination prediction model, the device, including a processor and memory, comprising:

an extracting unit configured to receive user's historical location data and extract input data and output data from the user's historical location data, the input data including a leaving location and associated time for the user, the output data including an arriving location for the user;

a determining unit configured to determine the user's possible activities of each location and their original probabilities based on the input data and the output data, and to adjust the original activity probabilities based on a user's arriving patterns and leaving patterns; and a prediction model obtaining unit configured to obtain the hierarchical destination prediction model based on the input data and the adjusted probabilities, wherein a high layer of the hierarchical destination prediction model represents activities and their transitions and a low layer of the hierarchical destination prediction model represents locations of the activities.

2. The device according to claim 1, wherein the determining unit is configured to obtain the user's possible activities of each location and their original probabilities by using manual annotation or map data calculation.

3. The device according to claim 1, wherein the determining unit is configured to judge whether the user's arriving patterns and leaving patterns for two locations are similar, and if they are similar, to increase probabilities of the same activity of the two locations and decrease probabilities of other activities of the two locations.

4. The device according to claim 1, wherein the prediction model obtaining unit is configured to obtain the hierarchical destination prediction model based on the input data and the adjusted probabilities by using at least one of: a Markov model, a Neural Network model, and a Frequent Pattern model.

5. The device according to claim 3, wherein the determining unit is configured to judge arriving patterns and leaving patterns for two locations that are similar if a previous location and a next location for one of the two locations are the same as those for the other of the two locations, respectively, and arriving times and leaving times for the two locations are within same time periods, respectively.

6. The device according to claim 3, wherein the determining unit is configured to judge arriving patterns and leaving patterns for two locations that are similar if a previous location and a next location for one of the two locations are close to those for the other of the two locations, respectively, and arriving times and leaving times for the two locations are within same time periods, respectively.

7. A destination prediction device, comprising:
a receiving unit configured to receive a user's leaving location and associated time; and
a predicting unit configured to apply a hierarchical destination prediction model, using a processor, to predict the user's destination and activity, based on the received user's leaving location and associated time;
wherein a high layer of the hierarchical destination prediction model represents activities and their transitions and a low layer of the hierarchical destination prediction model represents locations of the activities.

8. The destination prediction device according to claim 7, further comprising:
a storing unit configured to store a user's real location data, the user's real location data being used to update the user's historical location data.

9. A method for constructing a hierarchical destination prediction model, stored on a non-transitory computer readable storage medium, the method comprising:
receiving a user's historical location data and extracting input data and output data from the user's historical location data, the input data including a leaving location and associated time for the user, the output data including an arriving location for the user;
determining the user's possible activities of each location and their original probabilities based on the input data and the output data, and adjusting the original activity probabilities based on the user's arriving patterns and leaving patterns; and
obtaining the hierarchical destination prediction model based on the input data and the adjusted probabilities, wherein a high layer of the hierarchical destination prediction model represents activities and their transitions and a low layer of the hierarchical destination prediction model represents locations of the activities.

10. The method according to claim 9, wherein the user's possible activities of each location and their original probabilities are obtained by using manual annotation or map data calculation.

11. The method according to claim 9, wherein the step of adjusting comprises judging whether the user's arriving patterns and leaving patterns for two locations are similar, and if they are similar, increasing probabilities of the same activity of the two locations and decreasing probabilities of other activities of the two locations.

12. The method according to claim 9, wherein the step of obtaining comprises obtaining the hierarchical destination prediction model based on the input data and the adjusted probabilities by using any of a Markov model, a Neural Network model, or a Frequent Pattern model.

13. The method according to claim 11, wherein arriving patterns and leaving patterns for two locations are judged to be similar if a previous location and a next location for one of the two locations are the same as those for the other of the two locations, respectively, and arriving times and leaving times for the two locations are within same time periods, respectively.

14. The method according to claim 11, wherein arriving patterns and leaving patterns for two locations are judged to be similar if a previous location and a next location for one of the two locations are close to those for the other of the two locations, respectively, and arriving times and leaving times for the two locations are within same time periods, respectively.

* * * * *